United States Patent

Kobayashi et al.

[11] Patent Number: 5,249,647
[45] Date of Patent: Oct. 5, 1993

[54] DISK BRAKE WITH RETURN SPRING

[75] Inventors: Kinzo Kobayashi, Kanagawa; Shinichi Nakayama, Yamanashi, both of Japan

[73] Assignee: Tokico Ltd., Kanagawa, Japan

[21] Appl. No.: 900,721

[22] Filed: Jun. 18, 1992

[30] Foreign Application Priority Data

Jun. 20, 1991 [JP] Japan .............................. 3-046680[U]
Jul. 19, 1991 [JP] Japan .............................. 3-056598[U]
Oct. 18, 1991 [JP] Japan .............................. 3-085180[U]

[51] Int. Cl.$^5$ .......................................... F16D 55/224
[52] U.S. Cl. .................................. 188/72.3; 188/73.38
[58] Field of Search ................. 188/72.3, 73.31, 73.36, 188/73.38, 73.39

[56] References Cited

U.S. PATENT DOCUMENTS

| 4,491,204 | 1/1985 | Dirauf et al. | 188/73.38 |
| 4,940,119 | 7/1990 | Kondo et al. | 188/73.38 X |
| 5,069,313 | 12/1991 | Kato et al. | 188/72.3 |

FOREIGN PATENT DOCUMENTS

| 5411896 | 1/1954 | Japan . | |
| 88237 | 5/1985 | Japan | 188/72.3 |
| 3-1632 | 1/1991 | Japan . | |
| 1235367 | 6/1971 | United Kingdom | 188/72.3 |
| 2079878 | 1/1982 | United Kingdom | 188/73.38 |

Primary Examiner—Robert J. Oberleitner
Assistant Examiner—Kevin D. Rutherford
Attorney, Agent, or Firm—Wenderoth, Lind & Ponack

[57] ABSTRACT

A disk brake for a vehicle, for example, an automobile, is provided with a return spring to prevent dragging of pads by a disk when the brake is released. The disk brake has a carrier secured to a non-rotating part of a vehicle, a pair of friction pads supported by the carrier at respective positions which face each other across a disk, a pair of pad guides for slidably guiding the friction pads, a caliper supported by the carrier to press the pair of friction pads against the disk, and a linear return spring retained at both end portions thereof by the pair of friction pads, respectively, to bias the friction pads away from the disk. The return spring is bent radially of the disk at an intermediate portion thereof to form a single bent portion which is retained at the inward end thereof by a hook that is formed on the pad guide.

11 Claims, 9 Drawing Sheets

DISK BRAKE WITH RETURN SPRING

BACKGROUND OF THE INVENTION

1. Field of the Invention

The present invention relates to a disk brake which is attached to a vehicle, for example, an automobile.

2. Description of the Prior Art

One type of conventional disk brake is provided with a return spring for pads. The return spring biases the pads away from the disk in order to prevent a dragging of the pads by the disk when the brake is released.

This type of disk brake, provided with a return spring, is disclosed, for example, in Japanese Utility Model Post-Exam Publication No. 3-1632 (1991). The return spring of the disk brake disclosed in this publication has two loops in the intermediate portion thereof, and an angular U-shaped portion between the two loops to constitute an engagement portion, which extends in the circumferential direction of the disk. A pad guide, which supports brake pads slidably in the axial direction of the disk, is formed with an engagement projection, which is engaged with the engagement portion, thereby retaining the return spring in an erect position. Both end portions of the return spring are inserted into respective holes formed in the pads. Retainer portions, which are adjacent to these end portions, extend circumferentially of the disk at an acute angle to the end portions. The retainer portions and the tops of the end portions, which are inserted into the holes, are engaged with the bottom surface of the caliper, thereby preventing the end portions of the return spring from coming out of the holes.

In the above-described conventional device, since the return spring has two loops, the dimension in the axial direction of the disk is relatively large, so that the prior art is not suitable for disk brakes in which the thicknesses of the disk and the pads are small. In addition, since the return spring is held at the end portions by the caliper, the assembling of the disk brake is complicated.

SUMMARY OF THE INVENTION

It is an object of the present invention to provide an improved disk brake with a return spring, which is free from the above-described problems of the prior art.

To this end, the present invention provides a disk brake comprising: a carrier secured to a non-rotating part of a vehicle; a pair of friction pads supported by the carrier at respective positions which face each other across a disk; a pair of pad guides for slidably guiding the friction pads; a caliper supported by the carrier and extending across the disk to press the pair of friction pads against the disk; and a linear return spring retained at both end portions thereof by the pair of friction pads, respectively, to bias the friction pads away from the disk. The return spring is bent radially of the disk at an intermediate portion thereof between the two end portions to form a single bent portion between the end portions. The bent portion is retained at the inward end thereof as viewed in the radial direction of the disk by arresting means that is formed on the pad guide.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DETAILED DESCRIPTION OF THE INVENTION

Prior to the description of embodiments of the present invention, the above-described prior art will be explained more specifically with reference to FIG. 6 to clarify the features of the present invention.

Figure 6:
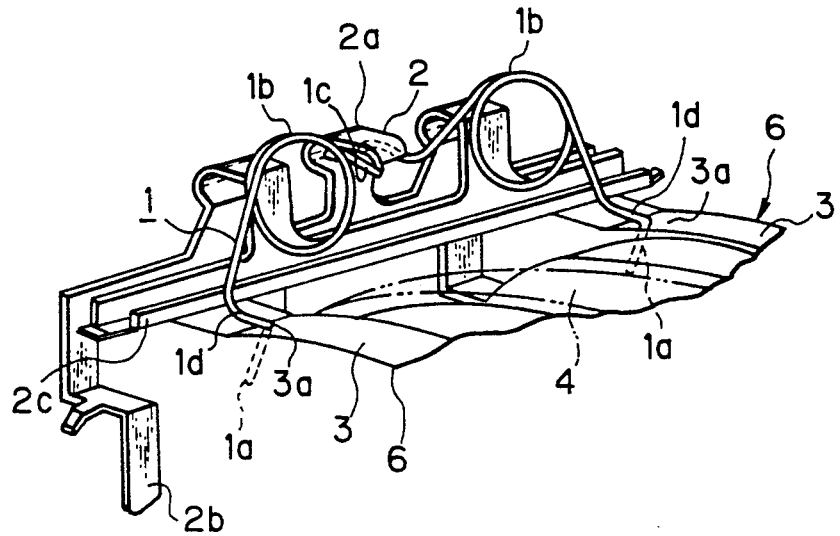
FIG. 6 shows a conventional disk brake with a return spring.

In the prior art shown in FIG. 6, a return spring 1 has two loops (bent portions) 1b formed in the intermediate portion thereof, and an angular U-shaped engagement portion 1c is formed inbetween the loops 1b. The return spring 1 further has retainer portions 1d which extend respectively, from two end portions 1a at an acute angle to them. The end portions 1a of the return spring 1 are inserted into respective holes formed in pads 6 at the inner side of the disk pass portion of a caliper (not shown in FIG. 6), thereby retaining the return spring 1 in position.

The engagement portion 1c extends circumferentially of a disk 4 toward a pad guide 2 provided on a carrier (not shown in FIG. 6) for slidably guiding a pair of pads 6 in the axial direction of the disk 4, and it abuts against an engagement projection 2a of the pad guide 2 at the inner side thereof with respect to the radial direction of the disk 4, the projection 2a extending from the carrier in the circumferential direction of the disk 4. When the return spring 1 is attached to the disk brake, the end portions 1a are inserted into respective holes 3a provided in backing plates 3 of the pads 6, thereby retaining the spring 1. The pad guide 2 is formed with a retainer portion 2b which is fitted to a step portion or guide projection of the carrier, and a pressing portion 2c which extends upwardly from the retainer portion 2b and then bends downwardly to press the pads 6.

Figure 1:
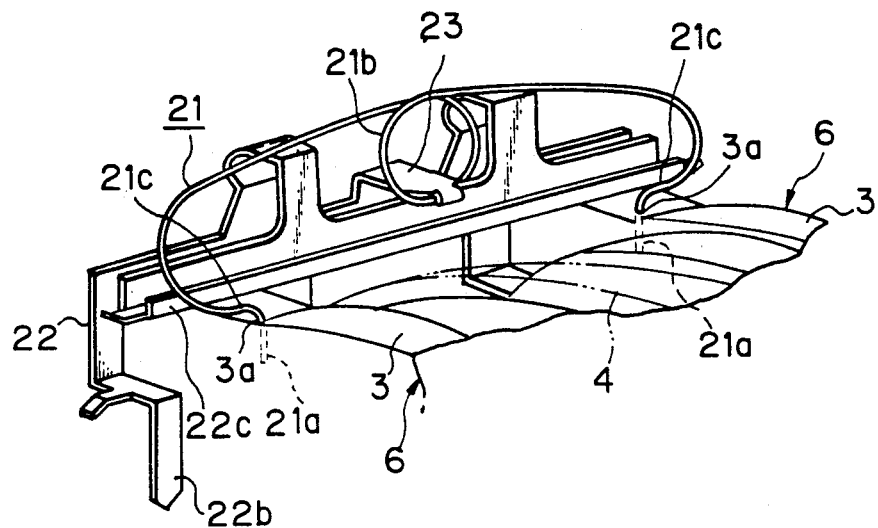
FIG. 1 is a perspective view of a first embodiment of a portion of a disk brake according to the invention.
Figure 2:
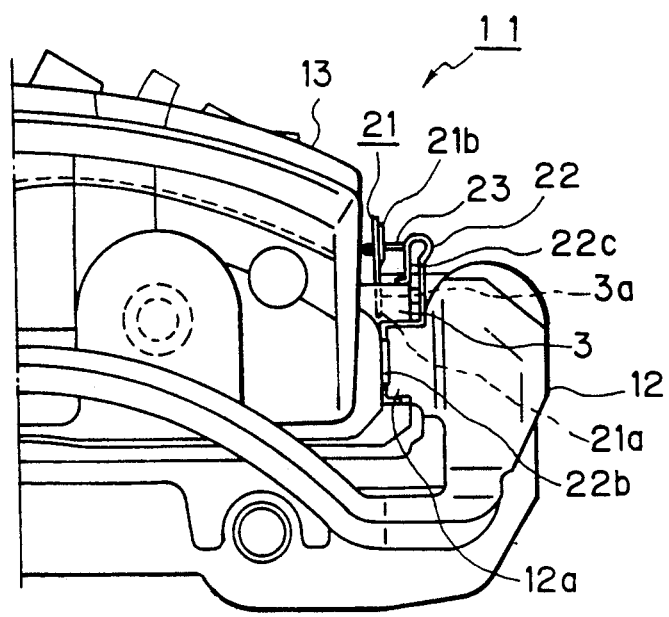
FIG. 2 is an elevational view of the disk brake which shows, in addition to the elements shown in FIG. 1, a carrier and a caliper.
Figure 3:
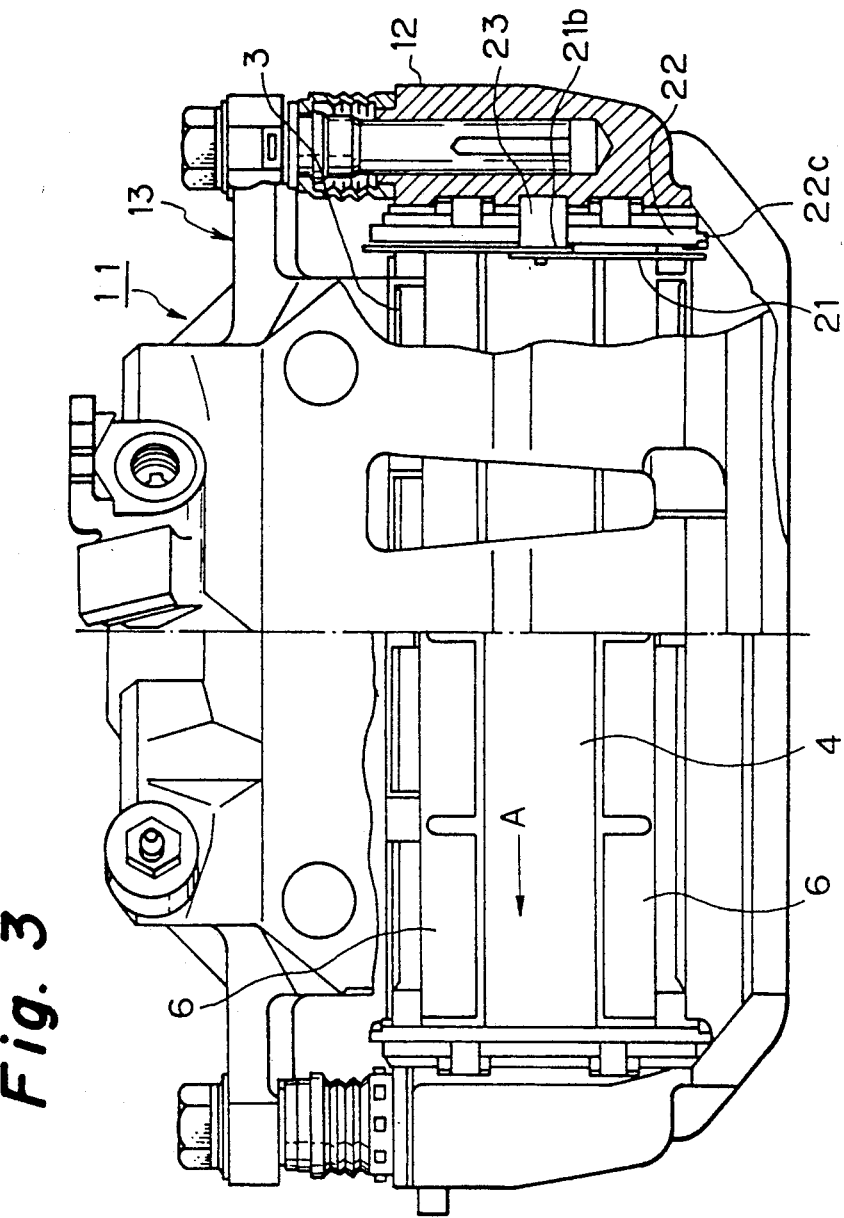
FIG. 3 is a top plan view of the disk brake of FIG. 2.

FIGS. 1 to 3 show one embodiment of the present invention. In these figures, the same structural portions or members as those in the prior art are denoted by the same reference numerals, and a description thereof is omitted.

Referring to FIGS. 2 and 3, a disk brake 11 comprises a carrier 12 which is secured to a non-rotating part of a vehicle, a caliper 13 which extends across a disk 4 and is supported by the carrier 12 in such a manner as to be slidable in the axial direction of the disk 4, and a pair of pads (friction pads) 6 which are supported by the carrier 12 at respective positions which face each other across the disk 4, the pads 6 being slidable perpendicularly to the plane of the disk 4 along a pad guide 22 attached to the carrier 12. When the caliper 13 presses the pads 6 against the disk 4, friction occurs between each pad 6 and the disk 4, thereby braking the wheel, and thus decelerating the vehicle. The above-described arrangement of the disk brake is generally known. The disk brake 11 may be of a type which incorporates part of a parking brake system or of a type independent of a parking brake system. The invention is applicable to both types.

In addition, the disk brake 11 has a return spring 21 which is provided for the pads 6 in order to minimize a dragging of the pads by the disk. The return spring 21 will next be described. Both end portions 21a of the return spring 21 are inserted into respective holes (retaining holes) 3a formed in backing plates 3 of the pads 6 and are thus retained therein. The depth of the holes 3a is greater than the length of the end portions 21a of the return spring 21.

Figure 4:
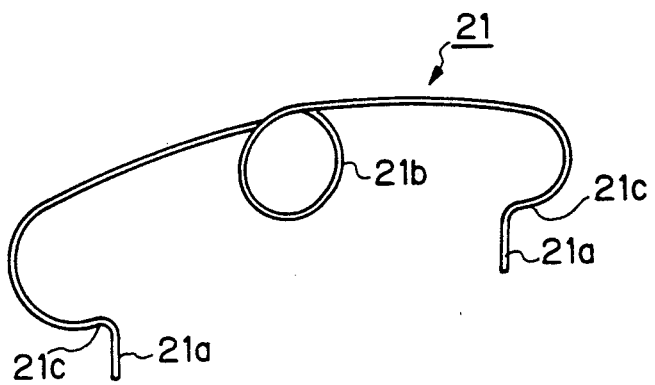
FIG. 4 is a perspective view of a return spring employed in the first embodiment of the present invention.

The intermediate portion of the return spring 21 that is inbetween the two end portions 21a lies within a plane substantially perpendicular to the radial direction of the disk 4, that is, to the surfaces of the disk 4 (i.e., the surfaces which are contacted by the pads 6). The intermediate portion is formed with a loop (bent portion) 21b, the starting and terminating end portions of which cross each other at the outward end of the loop 21b as viewed in the radial direction of the disk 4, as shown in FIG. 4, so that an effective resilient force can be provided. In addition, positioning portions 21c, interposed between the end portions 21a and the loop 21b, are bent to extend from the end portions 21a away from each other in the axial direction of the disk 4.

As shown in FIG. 2, the pad guide 22 has a retainer portion 22b which is fitted to a guide projection 12a formed on the carrier 12, and a pressing portion 22c which first extends upwardly from the retainer portion 22b and then bends downwardly to press the pads 6.

The pad guide 22 has arresting means in the form of a hook 23 formed on the top of the center thereof such that the hook 23 extends toward the return spring 21. The distal end portion of the hook 23 is bent radially inward of the disk 4. The distal end portion of the hook 23 retains the loop 21b at the inward end thereof as viewed in the radial direction of the disk 4, thereby supporting the loop 21b.

The end portions 21a of the return spring 21 having the above-described configuration are fitted into the respective holes 3a, and the loop 21b is retained by the distal end portion of the hook 23, thereby allowing the return spring 21 to be reliably fitted between the caliper 13 and the carrier 12 (more specifically, between the caliper 13 and the pressing portion 22c of the pad guide 22) at the side surface of the caliper 13.

In other words, the return spring 21 is located outside of an area where the caliper 13 and the disk 4 overlap, i.e. does not extend to the inner side of the disk pass portion of the caliper 13.

With the disk brake 11 described above, when the brake pedal is pressed, hydraulic pressure is supplied into a cylinder (not shown) formed in the caliper 13, so that the pad 6 which is shown to the left of the disk 4 in FIG. 3 is pressed against the disk 4 by the hydraulic pressure, and the reaction acting on the caliper 13 causes it to move leftwardly as viewed in the figure, thus causing the pad 6 at the right-hand side of the disk 4 to be pressed against the disk 4. In this way, the caliper 13 clamps the disk 4 through the pads 6. Thus, the rotation of the tire is decelerated by friction occurring between each pad 6 and the disk 4, the vehicle thus being braked.

When the brake is released to thereby terminate the clamping of the disk 4 by the caliper 13, the pads 6 are separated from the disk 4 by the biasing force of the return spring 21.

At this time, since the return spring 21 used in the disk brake 11 of this embodiment has the loop 21b formed in the center thereof and hence has effective resilience, the pads 6 can be separated from the disk 4 effectively and speedily. Thus, it is possible to prevent a dragging of the pads 6 by the disk 4 and hence 1a nonuniform wearing of the pads 6.

In addition, the disk brake 11 of the above-described embodiment has a structure in which the return spring 21 has only one loop 21b to provide the required resilience and this loop 21 is retained by the hook 23 of the pad guide 22, and it is therefore possible to shorten the length of the return spring 21 in the axial direction of the disk 4. Accordingly, the return spring 21 can also be fitted extremely favorably to a disk brake having a thin disk 4 and thin pads 6.

In addition, since the return spring 21 is fitted inbetween the caliper 13 and the carrier 12 at the side surface of the caliper 13, it can be mounted extremely easily even after the caliper 13 has been assembled. In other words, the return spring 21 can be mounted irrespective of the assembling order, and it is therefore possible to minimize the extent of reconstruction needed for the existing assembly line.

Moreover, since the starting and terminating end portions of the loop 21b cross each other at the outward end thereof as viewed in the radial direction of the disk 4, the capability of the return spring 21 to deform between the end portions 21a is increased, so that deflection caused by the movement of the pads 6 when worn can effectively be absorbed by the deformation of the loop 21b.

In addition, the depth to which the end portions 21a of the return spring 21 are inserted into the holes 3a can be reliably limited by the positioning portions 21c, which are bent to extend from the respective end portions 21a in the axial direction of the disk 4, so that it is possible to prevent the end portions 21a from being excessively inserted into the holes 3a. Hence, it is possible to prevent the disengagement of the return spring 21 from the hook 23 (if one end portion 21a is excessively inserted into the hole 3a, the other end portion 21a is likely to come out of the hole 3a).

Figure 5A:
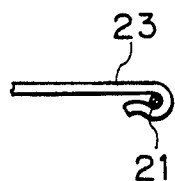
FIGS. 5(A) and 5(B) show, respectively, modifications of a hook for retaining the return spring.

It should be noted that the configuration of the hook 23 of the pad guide 22 for retaining the return spring 21 is not necessarily limited to that described in the embodiment. FIG. 5(A) shows a hook 23 whose distal end portion is first bent toward the inner surface thereof and then bent away from it so that the hook 23 has a clip-like configuration. More specifically, the loop 21b is fitted to the hook 23 through the nip formed by the bent distal end portion, thereby enabling the return spring 21 to be reliably retained.

Figure 5B:
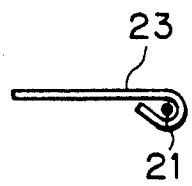

FIG. 5(B) shows a hook 23 whose distal end portion is folded back with the loop 21b retained therein, thereby enabling the loop 21b to be reliably retained.

Although the disk brake 11 of the above-described embodiment is provided with the return spring 21 at each of the rotor inlet side of the caliper 13 (i.e., the upstream side of the caliper 13) and the rotor outlet side (i.e., the downstream side of the caliper 13), only one of them (at the rotor inlet side) is shown for convenience of illustration. The specific structure of the disk brake 21 in the described embodiment is not limitative.

Figure 7:
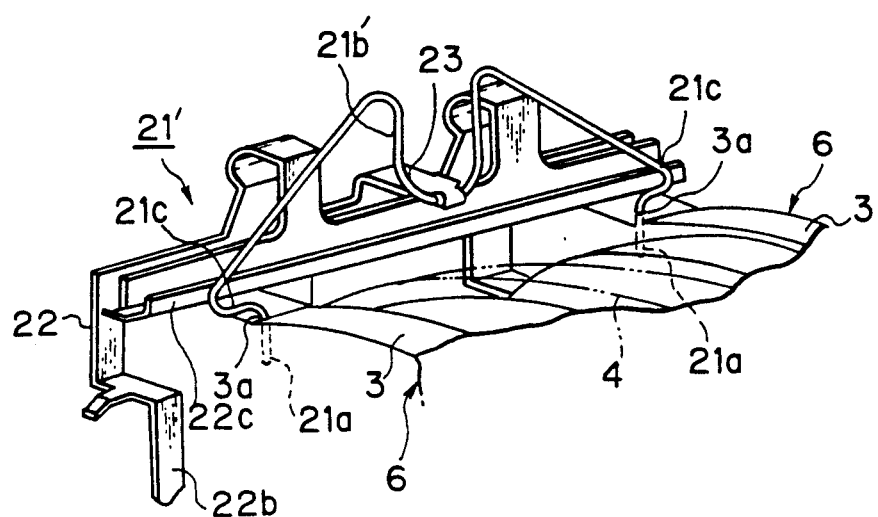
FIG. 7 shows a modification of the return spring employed in the first embodiment.

FIG. 7 shows a modification 21' of the above-described return spring 21. The return spring 21' has a bent portion 21'b which is not looped but has a substantially U-shaped configuration. The U-shaped bent portion 21'b is retained by the hook 23 at the innermost position thereof in the radial direction of the disk 4. In this modification, the intermediate portion of the return spring 21' between each positioning portion 21c and the bent portion 21'b has a substantially linear form.

Figure 8:
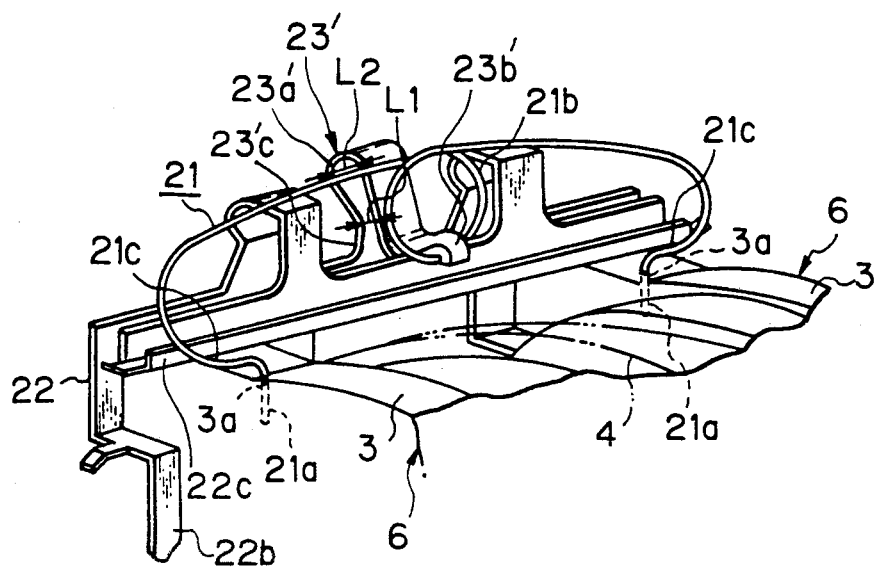
FIGS. 8 and 9 correspond to FIGS. 1 and 2, respectively, and show a second embodiment of the disk brake according to the present invention.
Figure 9:
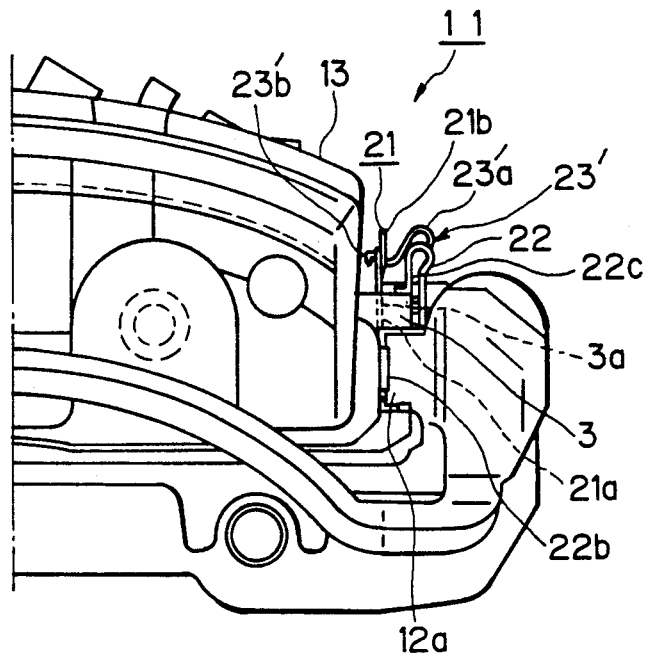

FIGS. 8 and 9 show another embodiment of the present invention, FIG. 8 being a view similar to FIG. 1. In the following, only the portion of the second embodiment which are different from the first embodiment shown in FIG. 1 will be explained, and a description of the other portions will be omitted.

In the second embodiment, as shown in FIGS. 8 and 9, arresting means in the form of a hook 23' that is formed in the center of the pad guide 22 has a bent portion 23'a which first extends outwardly (i.e., upwardly) in the radial direction of the disk 4 at an inclination from the pads 6, and which is then bent radially inwardly of the disk 4. In addition, the distal end portion 23'b of the hook 23' is first bent upwardly and then downwardly to define an inverse U-shape. The inverse U-shaped distal end portion 23'b retains the loop 21b by engaging the upper side of the spring at the inward (i.e., lower) end of the loop as viewed in the radial direction of the disk 4, thereby supporting the return spring 21. Thus, the hook 23' functions effectively as a spring in which the distal end portion 23'b supports the return spring 21 at a little distance from the bent portion 23'a. In other words, the overall elastic deformation of the hook 23' is increased. In addition, it is possible to prevent the return spring 21 from falling toward the hook 23' or separating from it.

Further, the distance L1 between a portion 23'c of the hook 23' that connects with the retainer portion 22b and a portion of the hook 23' near the distal end portion 23'b is smaller than the diameter L2 of a circle defined by the bent portion 23'a.

Thus, the hook 23' of the pad guide 22 that retains the return spring 21 of the disk brake 11 in the second embodiment is formed with the bent portion 23'a which first extends outwardly (i.e., upwardly) in the radial direction of the disk 4 with an inclination away from the pads 6, and which is then bent radially inwardly of the disk 4, thereby enabling the spring constant of the hook 23' to decrease. Accordingly, when the brake is activated, the pads 6 are moved toward the disk 4, causing the return spring 21 to be elastically deformed. At this time, the bent portion 23'a of the hook 23 is elastically deformed as the return spring 21 is deformed. That is, when the amount of movement of the pads 6 increases as a result of the wear of the pads 6, the amount of deformation of the return spring 21 increases. In such a case, in the disk brake 11 of the second embodiment the hook 23' is elastically deformed as the return spring 21 is deformed, thereby accommodating for the increased deformation of the return spring 21. Thus, it is possible to prevent breakage of the return spring 21 due to the increase in the deformation thereof.

In addition, since the distance L1 between the portion 23'c of the hook 23' that connects with the retainer portion 22b and the portion of the hook 23' near the distal end portion 23'b is smaller than the diameter L2 of a circle defined by the bent portion 23'a, the spring constant of the hook 23' is further reduced, so that it is possible to take up a larger deformation of the return spring 21 and hence, it is more effective in preventing breakage of the return spring 21 due to the increase in the deformation thereof. Accordingly, the lifetime of the return spring 21 can be extended, and a disk brake of extremely high reliability can be obtained.

Although the return spring 21 in the second embodiment is formed with the loop 21b as a bent portion to obtain the required resilience, it should be noted that the bent portion that is formed in order to make the return spring 21 sufficiently resilient may have configurations other than the loop-shaped configuration.

In the conventional disk brake with the return spring 1, shown in FIG. 6, as the pads 6 wear, they become inclined such that end portions of the pads 6 which are remote from the return spring 1, that is, the inward end portions of the pads 6 as viewed in the radial direction of the disk 4, come closer to the disk 4 and are therefore likely to contact the disk 4, causing dragging. This problem still remains unsolved in the foregoing embodiments.

Figure 10:
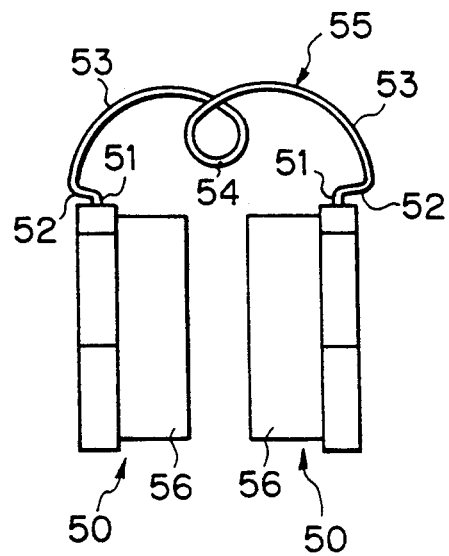
FIGS. 10 an 11 are schematic views showing the relationship between a return spring and pads.

For example, FIG. 10 is a schematic view showing the relationship between a return spring 55 and pads 50, which are arranged in the same form as in the embodiment shown in FIG. 1. The return spring 55 has end portions 51 which are retained by the respective pads 50, positioning portions 52 which extend a little from the respective end portions 51 away from a disk (not shown), substantially perpendicularly to the plane of the disk, arcuate connecting portions 53 which first extend from the respective outer ends of the positioning portions 52 outwardly (i.e., upwardly as viewed in FIG. 10) in the radial direction of the disk and then extend toward the disk, and a bent portion 54 which connects together the connecting portions 53 and which is looped radially inwardly of the disk so as to be retained by a pad guide (not shown).

Figure 11:
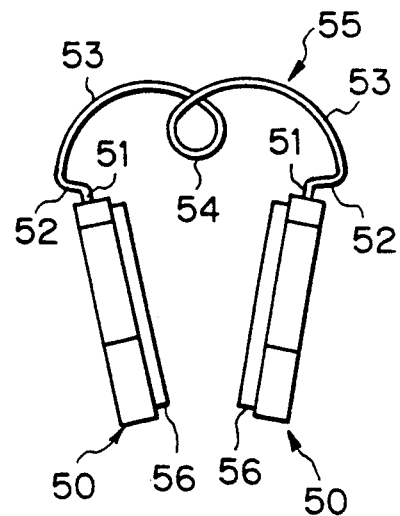

In the case of the return spring 55 having the described configuration, as the linings 56 of the pads 50 wear, the pads 50 are inclined such that the inward end portions thereof as viewed in the radial direction of the disk come closer to each other, as shown in FIG. 11, so that the inward end portions of the pads 50 are likely to contact the disk, thus causing dragging.

More specifically, as the wear of the linings 56 increases, the deformation of the return spring 53 in the horizontal direction as viewed in the figure increases, so that the end portions 51 are angularly displaced to come closer to each other as the distance from the positioning portions 52 increases, i.e., toward the lower side as viewed in the figure.

The aim of the following embodiments is to solve the above-described problem.

A third embodiment of the present invention will be described below with reference to FIGS. 12, 13, 14 and 15.

Referring to these figures, each pad 106 has a backing plate 114 which has at both ends thereof support portions 112 each supported by a carrier 102 through a pad guide 107 and which has a body portion 113 provided in between the support portions 112. The pad 106 further has a lining 116 which is rigidly secured to the side 115 of the body portion 113 of the backing plate 114 which is closer to a disk (not shown) so that the lining 116 comes into contact with the disk to produce a frictional force. A hole 119 for retaining a return spring 118 (described later) is provided in the outer peripheral surface 117 of each backing plate 114, as viewed in the radial direction of the disk, at a predetermined position near each support portion 112, the hole 119 extending substantially perpendicularly to the outer peripheral surface 117.

The pad guide 107 has a pair of parallel upper and lower plate portions 122 and 123 that slidably support the top 120 and the bottom 121, respectively, of the support portion 112 of each pad 106. The pad guide 107 further has a base portion 125 which connects together the upper and lower plate portions 122 and 123 at the sides thereof which are remote from the pads 106, the base portion 125 being contacted by the end faces 124 of the pads 106. In addition, the pad guide 107 has a flat plate portion 126 which extends upwardly from that end of the upper plate portion 122 which is closer to the pads 106, a retaining portion 127 which is provided in the intermediate portion of the flat plate portion 126 to prevent the pad guide 107 from coming off the carrier 102, and arresting means in the form of a hook 128 which is provided at the upper end of the flat plate portion 126 to retain the return spring 118. The hook 128 first extends a little upwardly from the upper end of the flat plate portion 126 and is bent in an inverse U-shape and then is bent in the opposite direction in a V-shape and further is bent in the opposite direction in an inverse U-shape with the distal end extending a little downwardly. The return spring 118 is retained by the inverse U-shaped end portion.

Figure 12:
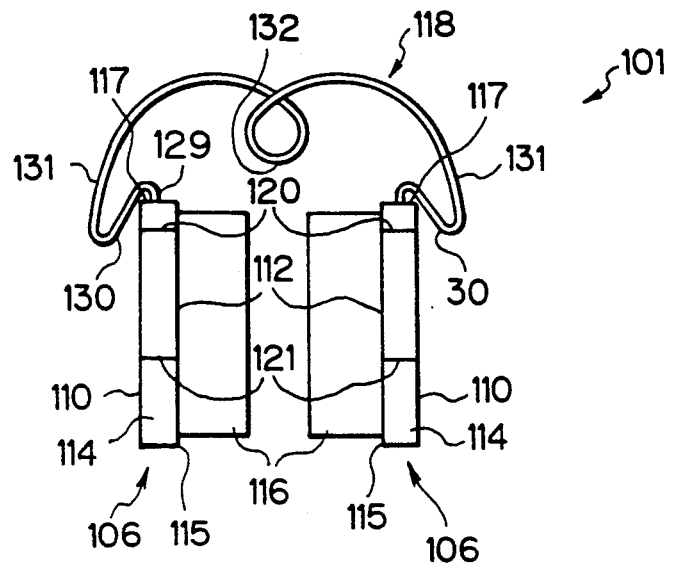
FIGS. 12, 13, 14 and 15 show a third embodiment of the disk brake according to the present invention.
Figure 13:
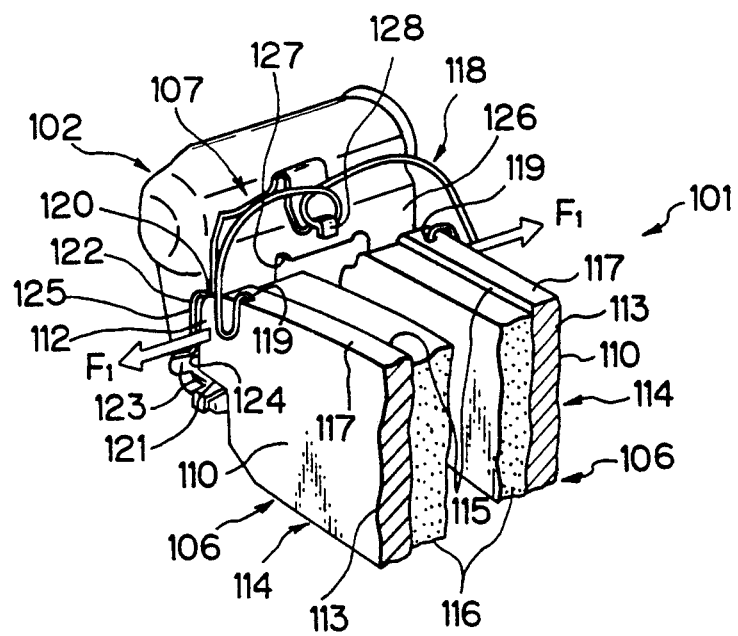
Figure 14:
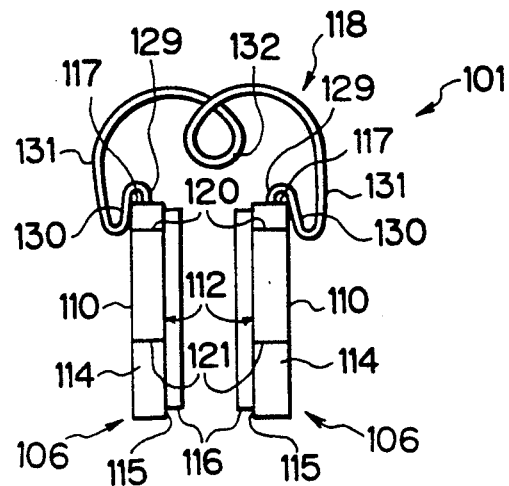
Figure 15:
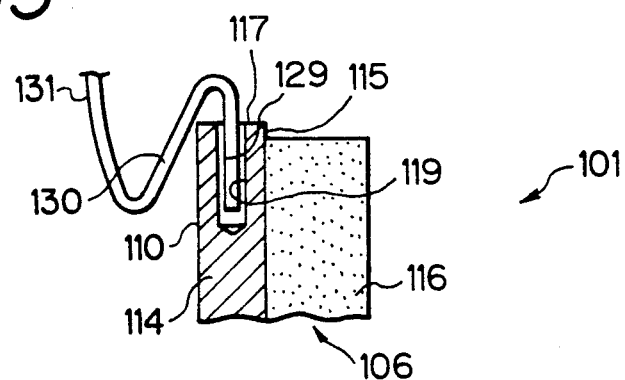

As shown in FIG. 12, the return spring 118 in the third embodiment, which is provided to bias the pads 106 away from the disk, has end portions 129 which are inserted a predetermined amount into respective retaining holes 119 provided in the outer peripheral surfaces 117 of the pads 106 at the outward ends thereof as viewed in the radial direction of the disk (i.e., at the upper ends as viewed in FIG. 12). The return spring 118 further has U-shaped portions 130 which first extend a little away from the disk (i.e., outwardly as viewed in FIG. 12) from the respective upper ends of the end portions 129, extend around to the rear sides 110 of the pads 106 and then bend away from the disk and radially outward of the disk (i.e., upwardly as viewed in FIG. 12) in a U-shape. In addition, the return spring 118 has arcuate connecting portions 131 which first extend radially outward of the disk from the respective ends of the U-shaped portions 130 which are remote from the end portions 129 and then extend toward the disk, and a bent portion 132 which connects together the connecting portions 131, the portion 132 being looped radially inwardly of the disk. The return spring 118 is formed in the above-described configuration from a linear resilient member. The bent portion 132 is retained by the hook 128 of the pad guide 107 at the inward end (i.e., the lower end as viewed in FIG. 12) thereof as viewed in the radial direction of the disk (see FIG. 13).

With the disk brake 101 of the third embodiment, when the two pads 106 are pressed against the disk from the rear sides 110 by the caliper to brake the vehicle and then the pads 106 are released from the pressure applied from the caliper to cancel the braking operation, since the return spring 118 biases the pads 6 away from each other, the pads 106 slide away from the disk along the pad guide 107. At this time, since the effective length of the portions of the return spring 118 which are bendable is increased by virtue of presence of the U-shaped portions 130, the bendable portions are deformed sufficiently, so that even if the linings 116 of the pads 106 have become worn (see FIG. 14), the end portions 129 are prevented from inclining to a substantial degree. The U-shaped portions 130 are angularly displaced about the respective lower end portions of those portions 130 when the pads 106 are moved toward each other. However, the angular displacement of each U-shaped portion 130 takes place in a direction in which the inclination of the corresponding end portion 129 is canceled. For example, when the pads 106 are moved toward each other, the left-hand end portion 129 (as viewed in the figure) is caused to pivot counterclockwise; in this case, however, the corresponding U-shaped portion 130 pivots clockwise about its lower end portion, thus canceling the inclination of the end portion 129. In this way, the pads 106 can return to predetermined positions with their parallelism maintained and without inclining such that the inward end portions of the pads 106 as viewed in the radial direction of the disk come closer to each other. Accordingly, it is possible to prevent so-called dragging, that is, undesirable contact of the radially inward end portions of the pads 106 with the disk which might otherwise occur when the pads 106 return to the predetermined positions, not only when the linings 116 of the pads 106 have worn a little but also when they have worn to a great extent.

A fourth embodiment of the disk brake according to the present invention will next be described. Since the fourth embodiment differs from the third embodiment only in the configuration of the return spring, the difference will be mainly described below. It should be noted that portions or members common to the third and fourth embodiments are denoted by the same reference numerals and will be described as the need arises.

Figure 16:
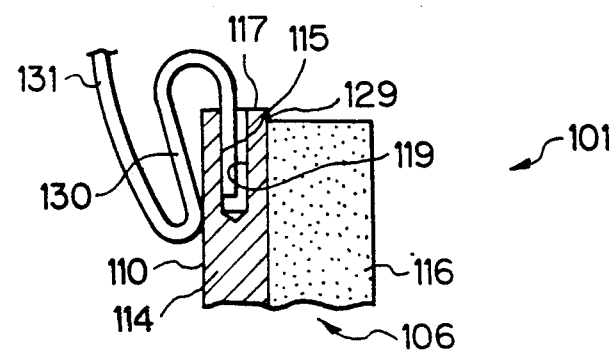
FIG. 16 is a fragmentary sectional view of an essential part of a fourth embodiment of the disk brake according to the present invention.

The return spring 118 of the disk brake 101 of the fourth embodiment is arranged to clamp the backing plate 114 of the pad 106 between the end portion 129 inserted into the retaining hole 119 and the U-shaped portion 130, as shown in FIG. 16. In other words, the distance between the end portion 129 and the U-shaped portion 130 when the spring 118 is relaxed is smaller than the thickness of the wall between the retaining hole 119 and the rear side surface 110 of the pad. Accordingly, the pad return force ($F_1$ shown in FIG. 13) of the return spring 118 can be made to act reliably and effectively on the radially inward portion of the pad 106 near the support portion 112, so that it is possible to prevent even more reliably the inclination of each pad 106 when it returns not only when the lining 116 of the pad 106 has worn a little but also it has worn to a great extent. In other words, in this embodiment a part of the backing plate 114 is clamped between the end portion 129 and the U-shaped portion 130, so that the force $F_1$ shown in FIG. 13 acts at a location which is more inward in the radial direction of the disk than in the case of FIG. 13.

More specifically, it is likely that in the disk brake 101 of the third embodiment, the end portion 129 of the return spring 118 will not be retained stably. For example, if the end portion 129 is retained in such a state that it is engaged with only the opening of the retaining hole 119, the pad return force of the return spring 118 acts on the outer peripheral surface 117 of the backing plate 114 at the outward end (i.e., upward end as viewed in FIG. 15) thereof as viewed in the radial direction of the disk. Accordingly, the pad return force, together with the sliding friction occurring between the pad 106 and the pad guide 107 when the pad 106 returns, causes the pad 106 to turn a little in a direction in which the radially inward end portion of the pad 106 comes closer to the disk. In the disk brake 101 of the fourth embodiment, however, the pad return force is made to act on the radially inward portion of the pad 106 reliably and effectively so as to minimize the moment.

Figure 17:
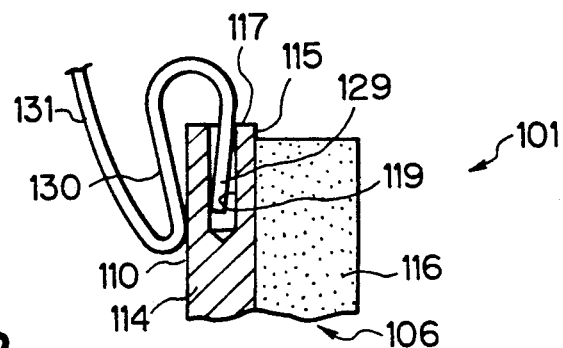
FIG. 17 is a fragmentary sectional view of a modification of the fourth embodiment.
Figure 18:
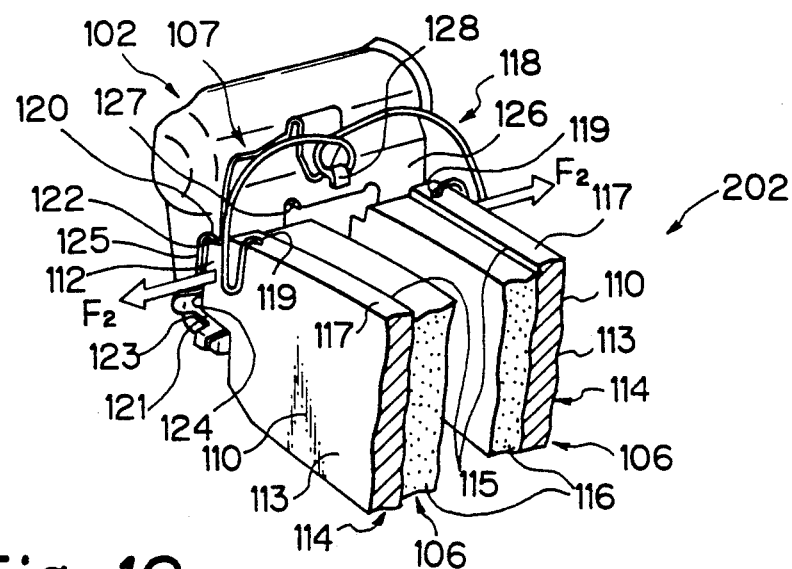
FIGS. 18 to 21 show a fifth embodiment of the disk brake according to the present invention.
Figure 19:
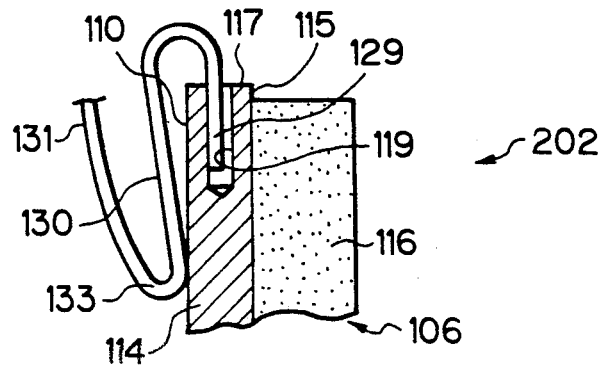
Figure 20:
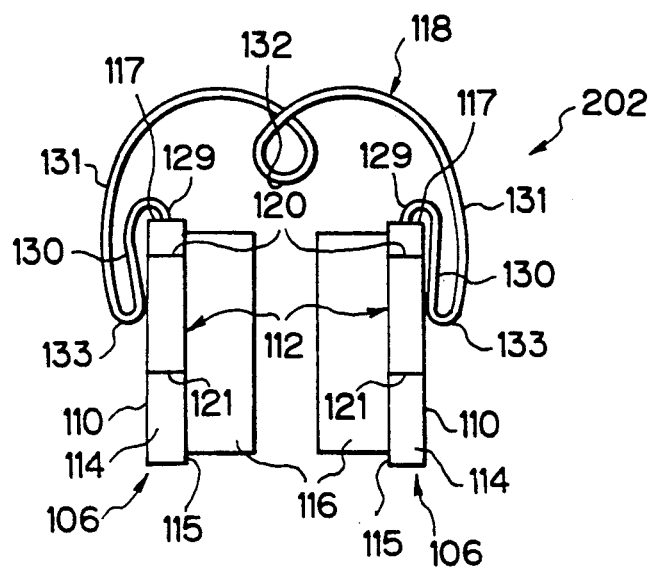
Figure 21:
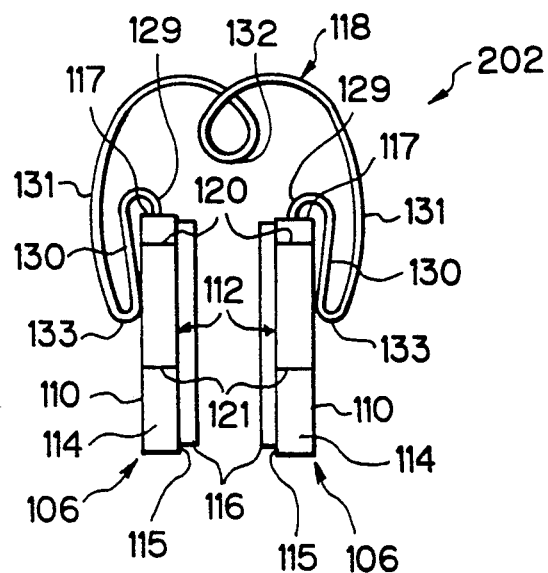

Although the end portion 129 of the return spring 118 of the fourth embodiment is arranged to contact the inner periphery of the retaining hole 119 in the pad 106 over substantially the entire length thereof to thereby clamp the pad 106, as shown in FIG. 16, the end portion 129 may be arranged such that only the distal end portion thereof contacts the inner periphery of the retaining hole 119 to clamp the pad 106, as shown in FIG. 17.

A fifth embodiment of the disk brake according to the present invention will next be described. Since the fifth embodiment differs from the fourth embodiment only in the configuration of the return spring, the difference will be mainly described below. It should be noted that portions or members common to the fourth and fifth embodiments are denoted by the same reference numerals and will be described as the need arises.

As shown in FIGS. 18 to 21, the return spring 118 employed in the disk brake 202 of the fifth embodiment is arranged to clamp the backing plate 114 of the pad 106 between the end portion 129 and the U-shaped portion 130. Moreover, the inward end 133 of the U-shaped portion 130 as viewed in the radial direction of the disk (i.e., the lower end as viewed in FIGS. 18 to 21) extends as far as the middle (i.e., substantially the middle between the top 120 and the bottom 121) of the support portion 112, which is a sliding guide portion of the pad 106. The upper and lower plate portions 122 and 123 of the pad guide 107, before supporting the pad 106, have their respective distal end portions a little slanted so that the distance between these end portions is shorter than the distance between the top 120 and the bottom 121 of the support portion 112 of the pad 106, thereby tightly clamping the support portion 112 of the pad 106. For this reason, sliding friction occurs between the top 120 and the bottom 121 of the pad 106 on the one hand and, on the other hand, between the upper and lower plate portions 122 and 123 of the pad guide 107 when the pad 106 returns. However, by virtue of the above-described arrangement of the return spring 118 of the fifth embodiment, the pad return force (i.e., the force counter to the sliding friction, shown by $F_2$ in FIG. 18) acts on the middle position counter to the sliding friction acting on the top 120 and the bottom 121 of the pad 106, so that it is possible to eliminate the moment which would otherwise act on the pad 106 due to the sliding friction and the pad return force. Thus, the inclination of each pad 106 when returned can be prevented even more reliably and effectively not only when the lining 116 of the pad 106 has worn a little but also when it has worn to a great extent (see FIG. 21).

The disk brake 201 of the fifth embodiment has been described by way of an example in which the levels of sliding friction occurring at the top 120 and the bottom 121 of the support portion 112 of the pad 106 when returned are substantially equal to each other. When the levels of sliding friction occurring at the top 120 and the bottom 121 of the support portion 112 are different from each other because of the arrangement of the pad guide 107, the position of the radially inward end 133 of the U-shaped portion 130 of the return spring 118 can be properly changed in accordance with the difference in the level of sliding friction. For example, if most of the sliding friction occurs at the bottom 121 of the support portion 112, the U-shaped portion 130 can be extended as far as to the vicinity of the bottom 121, and the depth of the retaining hole 119 and the length of the end portion 129 can be increased correspondingly, as a matter of course. Accordingly, the middle of the support portion 112 of the pad 106 does not simply mean the middle between the top 120 and the bottom 121 in terms of distance, but the position of the inward end 133 of the U-shaped portion 130 may be properly set so as to minimize the moment effectively in accordance with the ratio between the frictional forces occurring at the top 120 and the bottom 121. It is also possible to align the position of the inward end 133 of the U-shaped portion 130 with the position of the distal end of the end portion 129.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A disk brake of a vehicle having a rotary disk, said disk brake comprising:
   a carrier secured to a non-rotating part of the vehicle;
   a pair of friction pads supported by said carrier at respective positions which face toward each other on opposite sides of the disk;
   a pair of pad guides attached to said carrier, said pad guides slidably guiding said friction pads, respectively;
   a caliper supported by said carrier and extending across said disk, said caliper actuatable to press said pair of friction pads against said disk;
   a linear return spring located between said caliper and one of said pad guides and having two end portions retained by said pair of friction pads, respectively, said linear return spring biasing said friction pads away from said disk, said linear return spring having only one loop between said two end portions, and portions of said spring crossing one another at an outer end of the loop most remote from the disk in the radially outward direction thereof; and
   an arresting member extending from said one of said pad guides to an inner end of said loop, closest to the disk, and retaining the spring at said inner end of the loop thereof.

2. A disk brake according to claim 1, wherein said arresting member is elongate and has a first portion extending radially outwardly of said disk at an inclination away from said friction pads and a second portion bent radially inwardly to form a hook that extends to said inner end of the loop.

3. A disk brake according to claim 2, wherein the distance between a portion of said hook that extends from said one of said pad guides and a portion thereof near its distal end is smaller than the diameter of a circle defined by the second portion of said hook.

4. A disk brake according to claim 1, wherein said return spring has U-shaped portions first extending around to respective rear sides of said pads from the end portions of said spring and then extending radially outwardly of said disk, and arcuate connecting portions first extending radially outward of said disk from respective ends of said U-shaped portions which are remote from said end portions and then extending toward said disk, said loop connecting said connecting portions to one another.

5. A disk brake according to claim 4, wherein said linear return spring clamps said pads between said end portions and said U-shaped portions thereof.

6. A disk brake of a vehicle having a rotary disk, said disk brake comprising:
- a carrier secured to a non-rotating part of the vehicle;
- a pair of friction pads supported by said carrier at respective positions which face toward each other on opposite sides of the disk;
- a pair of pad guides attached to said carrier, said pad guides slidably guiding said friction pads, respectively;
- a caliper supported by said carrier and extending across said disk, said caliper actuatable to press said pair of friction pads against said disk;
- a linear return spring located between said caliper and one of said pad guides and having two end portions retained by said pair of friction pads, respectively, said linear return spring biasing said friction pads away from said disk, said linear return spring having a single bent portion intermediate said two end portions, said single bent portion lying entirely in a plane extending generally radially of said disk, said single bent portion extending radially inwardly with respect to said disk from portions of the spring adjacent said single bent portion, and the radially innermost part of said single bent portion with respect to said disk being located generally at the center between said friction pads; and
- an arresting member extending from said one of said pad guides and arresting said spring at the radially innermost part of said single bent portion, said arresting member being elongate and having a first portion extending radially outwardly of said disk at an inclination away from said friction pads and a second portion bent radially inwardly to form a hook that extends to the radially innermost part of said bent portion so as to retain said spring at said radially innermost part.

7. A disk brake according to claim 6, wherein said bent portion of said return spring is a loop in which portions of said spring cross at an end of the loop that is most remote from said disk in the radially outward direction thereof.

8. A disk brake according to claim 6, wherein said bent portion of said return spring is substantially U-shaped.

9. A disk brake according to claim 6, wherein the distance between a portion of said hook that extends from said one of said pad guides and a portion thereof near its distal end is smaller than the diameter of a circle defined by the second portion of said hook.

10. A disk brake according to claim 6, wherein said return spring has U-shaped portions first extending around to respective rear sides of said pads from the end portions of said spring and then extending radially outwardly of said disk, and arcuate connecting portions first extending radially outward of said disk from respective ends of said U-shaped portions which are remote from said end portions and then extending toward said disk, said loop connecting said connecting portions to one another.

11. A disk brake according to claim 10, wherein said linear return spring clamps said pads between said end portions and said U-shaped portions thereof.

* * * * *